Patented Aug. 23, 1949

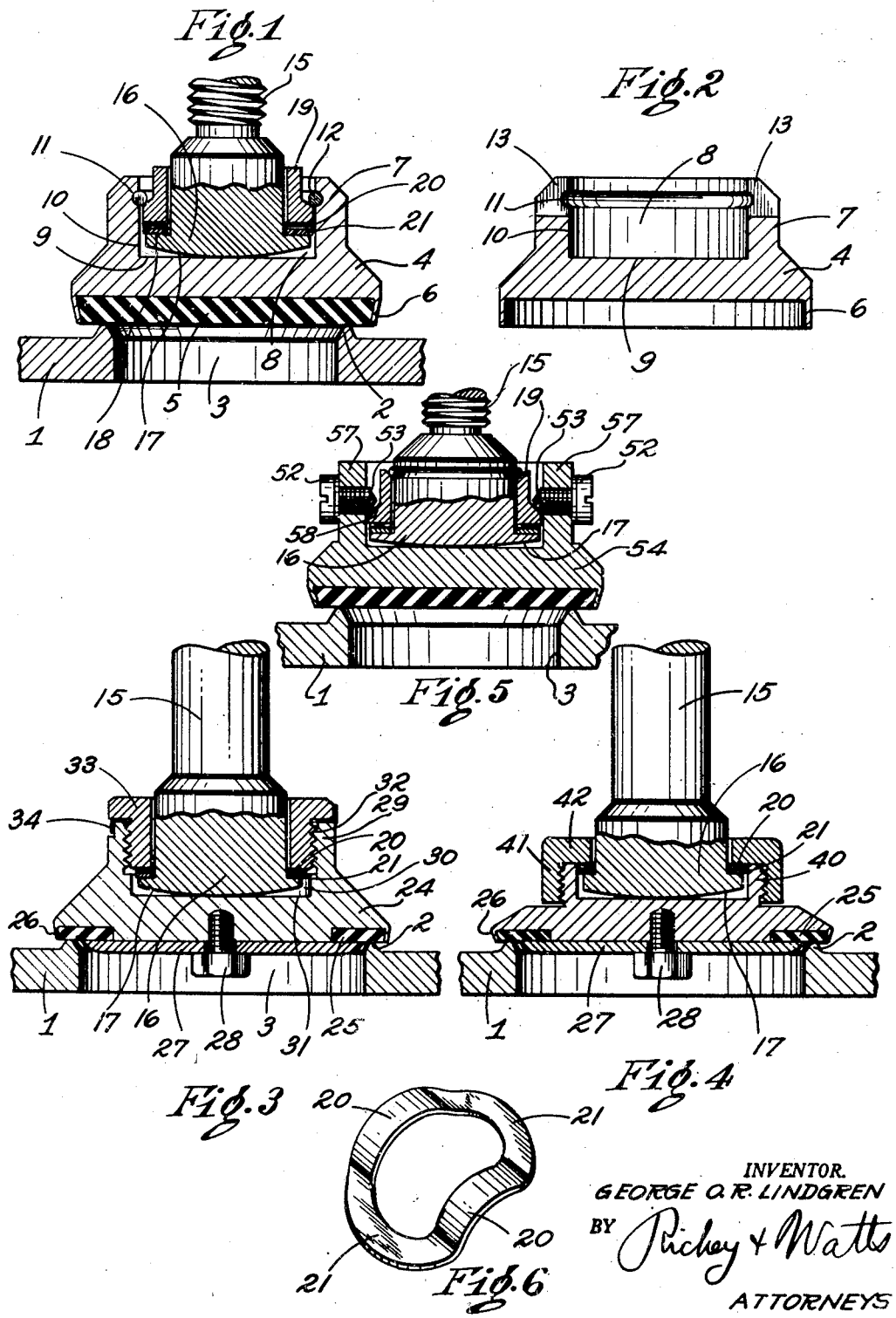

2,479,688

UNITED STATES PATENT OFFICE 2,479,688

VALVE DISK

George O. R. Lindgren, Willoughby, Ohio, assignor to The Weatherhead Company, Cleveland, Ohio, a corporation of Ohio Application May 25, 1944, Serial No. 537,264

2 Claims. (Cl. 251—46)

This invention relates generally to disc type valves and particularly to a new combination of valve disc and stem of a globe valve.

In prior disc type valves in which the stem and disc were directly connected together for rotation as a unit, the disc could not compensate for the misalignment of the valve seat or unequal wear on the disc or seat. In other types there was little or no rotation of the disc on its seat, substantially no compensating for wear of the stem and disc and considerable tendency of the valves to become leaky and noisy.

The present invention overcomes those prior disadvantages by providing a new combination of parts in which the disc and stem are so associated that the disc may align itself with its seat and will rotate with the stem and relative to the seat when engaging the seat with light pressure but will not rotate relative to the seat when heavy pressures are applied by the stem.

In the drawings accompanying and forming a part of this specification:

Fig. 1 is a fragmentary, cross sectional view through the stem, disc and seat of a valve embodying the present invention;

Fig. 2 is a central, sectional view through the valve disc of Fig. 1, showing the notches for removal of the locking ring;

Fig. 3 is a view similar to Fig. 1 but showing a modified form of the present invention;

Fig. 4 is a view similar to Fig. 1 showing a further modification of the invention;

Fig. 5 is a view similar to Fig. 1 showing a further modification of the invention; and Fig. 6 is a perspective view of a spring ring removed from the valve.

In Fig. 1 part of a valve body is shown at 1 with an annular valve seat 2 on the body surrounding fluid passage 3. The disc 4 is provided with a disc-shaped packing 5 which is greater in diameter than seat 2 and is positioned to engage said seat and close passage 3 against the flow of fluid therethrough. Packing 5 is mounted on one end of disc 4 within an annular flange 6 which may be spun inwardly to grip and hold the packing. The disc 4 has a cylindrical flange 7 extending from the side opposite packing 5 and defining a socket 8. The end wall 9 of the socket preferably has a plane surface substantially parallel to the seat engaging face of packing 5. Its side wall 10 is provided with an annular recess 11 to receive a locking ring 12. At opposite points flange 7 is slotted as at 13 (Fig. 2) to permit insertion of a tool to remove ring 12 from recess 11. Valve stem 15 projects into socket 8 and terminates in an enlarged head 16 which has a rounded end surface 17 to engage end wall 9, and an annular surface 18. Sleeve 19 surrounds stem 15 and is retained in socket 8 by ring 12. Suitable resilient means, such as the spring ring 21, having a resilient raised portion 20, is disposed in engagement with the inner end of the sleeve 19 and the annular surface 18 on the valve stem head 16. The spring ring 21 is suitably tensioned to assume, in unstressed condition, the shape illustrated in Fig. 6. The space between the inner end of the sleeve 19 and the annular surface 18 is less than the expanded axial height of the ring 21, but greater than the height of the ring in fully collapsed position. Thus the ring presses the rounded head surface 17 against the wall 9, but permits limited universal angular movement of the axis of the stem 15 with respect to the axis of the socket 8. The length of the space between the sleeve 19 and the annular surface 18 and the axial height of the ring 21 in collapsed and fully expanded condition, are so proportioned as to permit an angular deviation between the axes of the stem 15 and the socket 8 sufficient to compensate for any misalignment of the stem with respect to the valve seat 2 that may occur in practice, and also to maintain the rounded surface 17 on the stem head 16 firmly pressed against the socket wall 9 throughout any wear of the parts that may occur in the life of the valve. It will be apparent that other resilient means may be used if desired.

The apparatus of Figs. 1 and 2 operates substantially as follows: When the stem 15 is rotated in a suitably threaded part of the valve body (not shown) to advance the disc toward seat 2, the disc 4 rotates with the stem due to the frictional engagement between the rounded surface 17 on the stem and the wall 9, which are pressed together by the resilient members 20 and 21. If the seat 2 is not properly aligned with the disc 4, the resilient means permit automatic adjustment of the disc relative to the stem and its head 16 so that the packing 5 will engage seat 2 throughout its circumference, thus compensating for misalignment of the seat and stem and any variations in thickness of the packing 5. As the stem 15 continues to rotate after packing 5 has been brought into engagement with the seat, the disc 4 rotates with the head so long as the pressure exerted by the packing on seat 2 through the medium of the head and disc is insufficient to overcome the friction between the disc 4 and the stem head 16. During such rotation of the packing 5 on seat 2 the engaging surfaces are wiped against one another, removing any dirt or foreign matter that may have lodged on either surface, and come into liquid sealing contact at all points. As the pressure exerted by the stem on the packing increases, the friction resulting from the engagement of the packing 5 and seat 2 exceeds the frictional forces tending to prevent relative rotation of the head 16 and disc 4. Thereupon the disc ceases to rotate and further endwise rotational movement of stem 15 increases the sealing pressure of packing 5 on seat 2.

It will thus be understood that the disc 4 is capable of automatically aligning the packing with the seat and also of rotating with the valve stem when light pressures are being applied, and of not rotating with the stem or relative to the seat when heavier pressures are applied by the stem. Since the head 16 engages the wall 9 at a point in line with the axis of the stem 15, the closing force is uniformly distributed around the entire seat, even if the parts are misaligned.

In Fig. 3 the valve body 1, seat 2, passage 3, stem 15, enlarged head 16, rounded end surface 17 thereof and ring 21, are similar to correspondingly numbered parts shown in Fig. 1 and described hereinabove. The disc 24 is quite like disc 4 of Fig. 1. However, the packing 25 is annular in shape and seats in a correspondingly shaped recess in an end surface of the disc where it is retained partly by inwardly spun flanges 26 and partly by a plate 27 attached to the disc by a cap screw 28. The cylindrical flange 29 of disc 24 provides a socket 30 having an end wall 31 and an inner cylindrical surface provided with threads 32 to engage with threads on a collar 33 which may be locked in adjusted position by lock washer 34. The operation of the device shown in Fig. 3 and just described is substantially the same as the operation of the device of Fig. 1 as above described.

The modification of the present invention which is shown in Fig. 4 is quite like that shown in Fig. 3, the main difference being that the annular flange 40, which provides a socket for the enlarged head 16 of valve stem 15, is exteriorly screw threaded to engage collar 41 which has an inturned flange 42 to engage the outer surface of the ring 20. The apparatus of Fig. 4 operates in substantially the same manner as the devices of Figs. 1 and 3.

The modification of the invention shown in Fig. 5 is similar to that shown in Fig. 1, except that instead of the locking ring 12, two or more set screws 52 having pointed ends 53 are threaded through the flange 57 of the disc 54. The ends 53 of the set screws 52 engage the inclined shoulder 58 of the sleeve 19 which surrounds the stem 15 and engages the head 16 in the same manner illustrated in Fig. 1. The spring ring 21 is positioned and operates in the same manner as shown and described in Fig. 1.

Having thus described the invention so that others skilled in the art may be able to understand and practice the same, I state that what I desire to secure by Letters Patent is defined in what is claimed.

What is claimed is:

1. A valve body having a fluid passageway and an annular seat around said passageway, a socketed valve member of greater diameter than said passageway, packing on the valve member to engage said seat, said packing being softer than the seat, the bottom wall of the socket in said valve member having an outwardly facing surface, a rotatable valve stem member having a threaded portion adapted to engage a threaded body portion, said stem member having a terminal portion disposed in said socket having an inwardly-facing surface for engaging the outwardly-facing surface of said valve member, said surfaces being configured to provide for relative angular motion of said valve and stem members, said stem member having an outwardly-facing shoulder, said valve member including a sleeve in said socket and surrounding said stem, said sleeve member having an inwardly-facing shoulder axially spaced from the shoulder on said stem member, a snap ring in the side wall of said socket and engaging said sleeve to retain said members together, and a leaf spring washer bent to form a plurality of circumferentially-spaced, axially-oppositely extending protuberances, said washer being compressed between the shoulders on said members so as to resiliently align the axes of said members, said spring washer fractionally engaging and pressing against the shoulders on said members to resist relative rotation of said members, there being clearance between said members except at the engagement of said surfaces, said spring washer and the clearance between the members providing for relative angular movement thereof for alignment of the packing with said seat, said leaf spring washer being of such strength, and the engagement between said surfaces of the members and between the facing shoulders thereof being over such an area, that the frictional resistance to relative rotation of said valve member and stem exceeds the frictional resistance between the packing and the valve seat upon initial engagement of the latter parts to provide an initial wiping action, further closing pressure increasing the frictional resistance between the packing and valve seat to a point where it exceeds that between the valve and stem members so as to cause relative rotation of the latter at sealing pressures.

2. A valve body having a fluid passageway and an annular seat around said passageway, a valve member of greater diameter than said passageway, packing on the valve member to engage said seat, said packing being softer than the seat, said valve member having an outwardly-facing surface, a rotatable valve stem member having a threaded portion adapted to engage a threaded body portion, said stem member having an inwardly-facing surface for engaging the outwardly-facing surface of said valve member, said surfaces being configured to provide for relative angular motion of said valve and stem members, said stem member having an outwardly-facing shoulder, said valve member having an opening to loosely receive said stem member and a ring loosely surrounding said stem member, said ring having a shoulder axially spaced from the shoulder on said stem member, and a leaf spring washer bent to form a plurality of circumferentially-spaced, axially-oppositely extending protuberances, means carried by said valve member engaging said ring to maintain the ring, spring and members in assembled relation, said washer being compressed between the shoulders on said members so as to resiliently align the axes of said members, said spring washer frictionally engaging and pressing against the shoulders on said members to resist relative rotation of said members, there being clearance between said members except at the engagement of said surfaces, said spring washer and the clearance between the members providing for relative angular movement thereof for alignment of the packing with said seat, said leaf spring washer being of such strength, and the engagement between said surfaces of the members and between the facing shoulders thereof being over such an area, that the frictional resistance to relative rotation of said valve member and stem exceeds the frictional resistance between the packing and the valve seat upon initial engagement of the latter parts to provide an initial wiping action, further closing pressure increasing the frictional resistance between the packing and valve seat to a point where it exceeds that between the valve and stem members so as to cause relative rotation of the latter at sealing pressures.

GEORGE O. R. LINDGREN.

REFERENCES CITED

The following references are of record in the file of this patent:

UNITED STATES PATENTS

| Number | Name | Date |
| --- | --- | --- |
| 450,767 | Gold | Apr. 21, 1891 |
| 560,695 | Dodge | May 26, 1896 |
| 600,360 | Crane | Mar. 8, 1898 |
| 625,954 | Huxley | May 30, 1899 |
| 1,303,763 | Bradford | May 13, 1919 |
| 1,602,236 | Marscheider | Oct. 5, 1926 |
| 1,780,562 | Melling | Nov. 4, 1930 |
| 2,111,430 | Lamar | Mar. 15, 1938 |
| 2,192,339 | Wilson | Mar. 5, 1940 |
| 2,213,259 | Paget | Sept. 3, 1940 |